United States Patent
Wallet et al.

(10) Patent No.: US 6,363,327 B1
(45) Date of Patent: Mar. 26, 2002

(54) METHOD AND APPARATUS FOR EXTRACTING SELECTED FEATURE INFORMATION AND CLASSIFYING HETEROGENEOUS REGIONS OF N-DIMENSIONAL SPATIAL DATA

(75) Inventors: Bradley C. Wallet, San Francisco, CA (US); Robert Wentland, Boulder, CO (US); Peter Whitehead, San Rafael, CA (US)

(73) Assignee: Chroma Graphics, Inc., Burlingame, CA (US)

( * ) Notice: Subject to any disclaimer, the term of this patent is extended or adjusted under 35 U.S.C. 154(b) by 0 days.

(21) Appl. No.: 09/563,187

(22) Filed: May 2, 2000

(51) Int. Cl.$^7$ .................................................. G01V 3/18
(52) U.S. Cl. ........................................... 702/11; 702/1
(58) Field of Search ................................ 702/11, 16, 1, 702/14; 382/16; 367/82, 71, 31, 16

(56) References Cited

U.S. PATENT DOCUMENTS 4,906,940 A  *  3/1990 Greene et al. ................. 382/16
5,583,825 A  * 12/1996 Carrazzone et al. ........... 367/31
5,920,828 A  *  6/1999 Norris et al. ................. 702/14

* cited by examiner

Primary Examiner—Jay Patidar
Assistant Examiner—Victor J. Taylor
(74) Attorney, Agent, or Firm—Townsend and Townsend and Crew LLP; Kenneth R. Allen

(57) ABSTRACT

Given a spatial dataset of n dimensions, a data-driven partitioning of the dataset is effected into topographically contiguous regions using feature specific indices (for example, by examining the change in polarity of the impedance of seismic data). Then on each region, a set of features (which may be mathematical functions) is calculated (e.g., mean value of all data in the region), wherein the features are considered sufficiently descriptive of the region. Thereupon, two or more regions which are topographically contiguous are grouped together and the associated features are assembled in a structure (e.g., a vector or a matrix) to be input to a classifier.

6 Claims, 3 Drawing Sheets

METHOD AND APPARATUS FOR EXTRACTING SELECTED FEATURE INFORMATION AND CLASSIFYING HETEROGENEOUS REGIONS OF N-DIMENSIONAL SPATIAL DATA

BACKGROUND OF THE INVENTION

This invention relates to pattern recognition and more particularly to preprocessing of information in the form of feature extraction. Feature extraction technologies are known in the various fields of pattern recognition, character recognition, speech recognition and so forth. Classifiers are employed to map extractable features into decision sets.

Classifiers of the prior art are characterized by inherent scaling. Since data are often inherently limited as to class and recognizable elements, the problem of addressing scale is frequently moot. However, if the data are not examined with an appropriate scale, no classifier, no matter how sophisticated, will be able to sort the source data.

Feature extraction techniques are known, including edge detection, fixed-sized partitioning, region-based classification, borrowed strength classification. Often these techniques are limited by inherent scaling assumptions or inability to incorporate domain specific elements or expert knowledge, such as that a detected polarity change in seismic data represents an impedance or density change or that spoken words can be parsed into phonemes.

Pattern recognition and classification will benefit from improved feature extraction. The present invention is intended to provide such an improvement.

SUMMARY OF THE INVENTION

According to the invention, given a spatial dataset of n dimensions, in a data processing system, a data-driven partitioning of the dataset is effected into topologically contiguous regions using domain specific indices (for example, by examining the change in polarity of the impedance of seismic data). Then on each region, a set of features (which may be mathematical functions) is calculated (e.g., mean value of all data in the region), wherein the features are considered sufficiently descriptive of the region. Thereupon, two or more regions which are topologically, and in a specific embodiment topographically, contiguous are grouped together, and the associated features are assembled in a structure (e.g., a vector, a matrix, a mathematical graph or a typecode) to be input to a classifier. (A classifier is a function which maps data into a decision.)

A characteristic of the present invention is that contiguous regions of the dataset that are heterogeneous can be classified by considering the homogeneous elements which they contain, and that in some way the contiguous regions correspond to a real world characteristic or a manifestation of a real-world process.

The invention will be better understood by reference to the following detailed description in connection with the accompanying drawings.

DESCRIPTION OF THE SPECIFIC EMBODIMENTS

The invention is explained with reference to specific embodiments and in the context of abstract contexts. The invention has been identified as being immediately applicable to classification of data of various data sources, such as seismic data, speech data, image data including visual, radar and ultrasonic data, financial market data, communication security, weather data, demographic data, genetic data and the like. It is to be understood that this invention is intended to be implemented in a data processing system.

Figure 1:
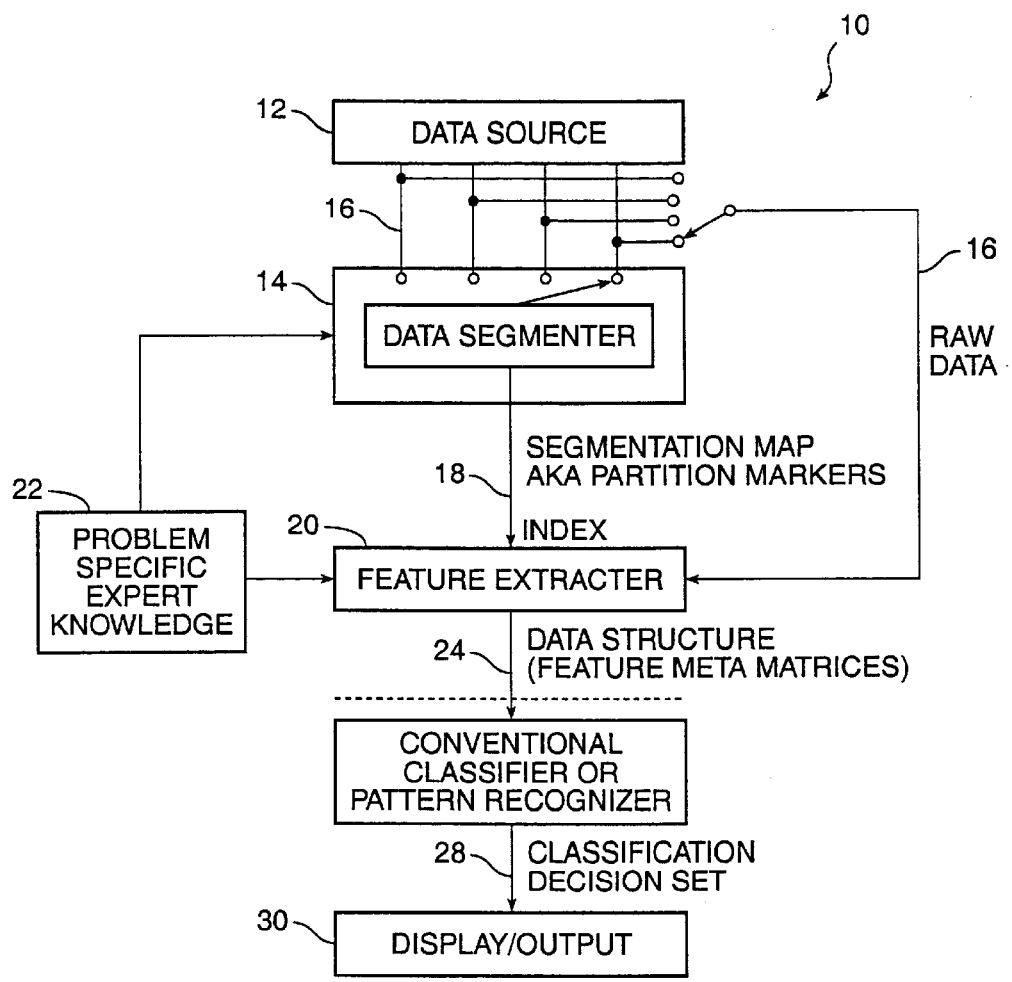
FIG. 1 is a block diagram of a system incorporating a method according to the invention including a standard classifier and a standard output device.

Referring to FIG. 1, there is shown a basic feature extraction system 10 in connection with a standard data classifier/pattern recognizer 26 and output/display device 30. The input is a dataset of raw data 16 from a data source 12, which, according to the invention, is partitioned in a data segmenter 14 according to a domain specific index, as hereinafter explained. The raw data 16 as partitioned by a segmentation map comprising partition markers 18 is then passed to a feature extracter 20 according to the invention, and the feature extracter 20 produces a data structure 24 according to the invention characteristic of a heterogeneous region in the form of feature meta matrices, which can be related to one another in an array.

According to the invention, problem-specific expert knowledge is applied to the feature extractor to specify the definition of the features, to calculate the features, to make the logical choice of the partitioning, to specify the aggregation method of features (adjacent or juxtaposed) and the scale of aggregation of features.

Figure 2:
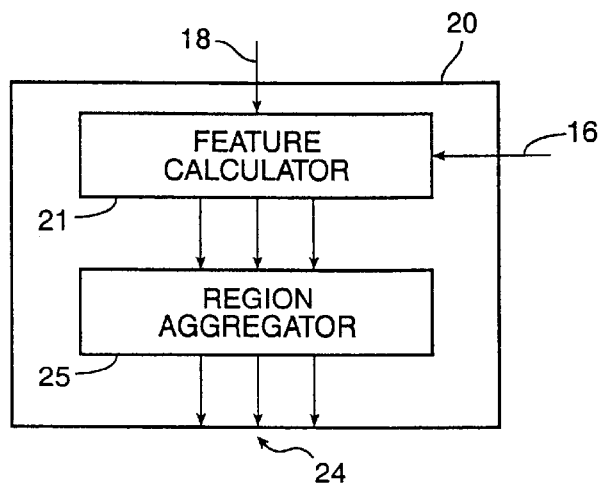
FIG. 2 is a block diagram of a feature extracter according to the invention.

FIG. 2 illustrates the basic elements of the feature extracter 20, namely a feature calculator 21 which accepts the segmentation map 18 and the raw data 16 and which produces feature sets 23 for each partition, the feature sets being a collection of features such as average amplitude, maximum amplitude, moment of a partition, maximum slope, compactness, size of partition, roughness, and any other feature that can be calculated on a set of data contained in the partition. The choice of features is provided by the expert constructing the system. The feature sets, once determined, are provided as input to a region aggregator 25, which groups the features according to an algorithm specified by the operator or expert constructing the system. The features are combined into groups or sets of meta features upon which classification decisions can be rendered. The groupings may for example be proximity of partitions to one another in space or time or proximity in abstract space as defined by the underlying topology. For example, all features of a particular type and above a certain value might be clustered.

Figure 3:
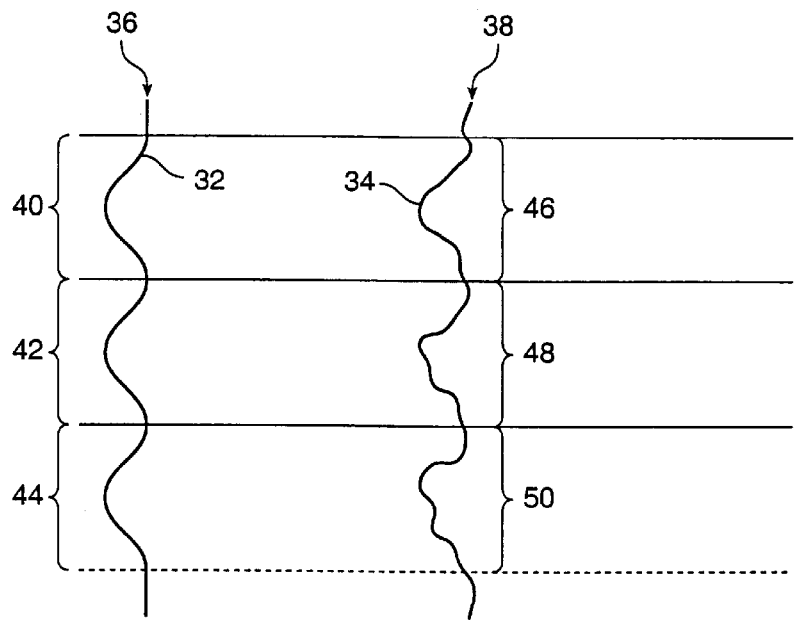
FIG. 3 is a representation of one-dimensional raw data to be analyzed according to the invention.
Figure 4:
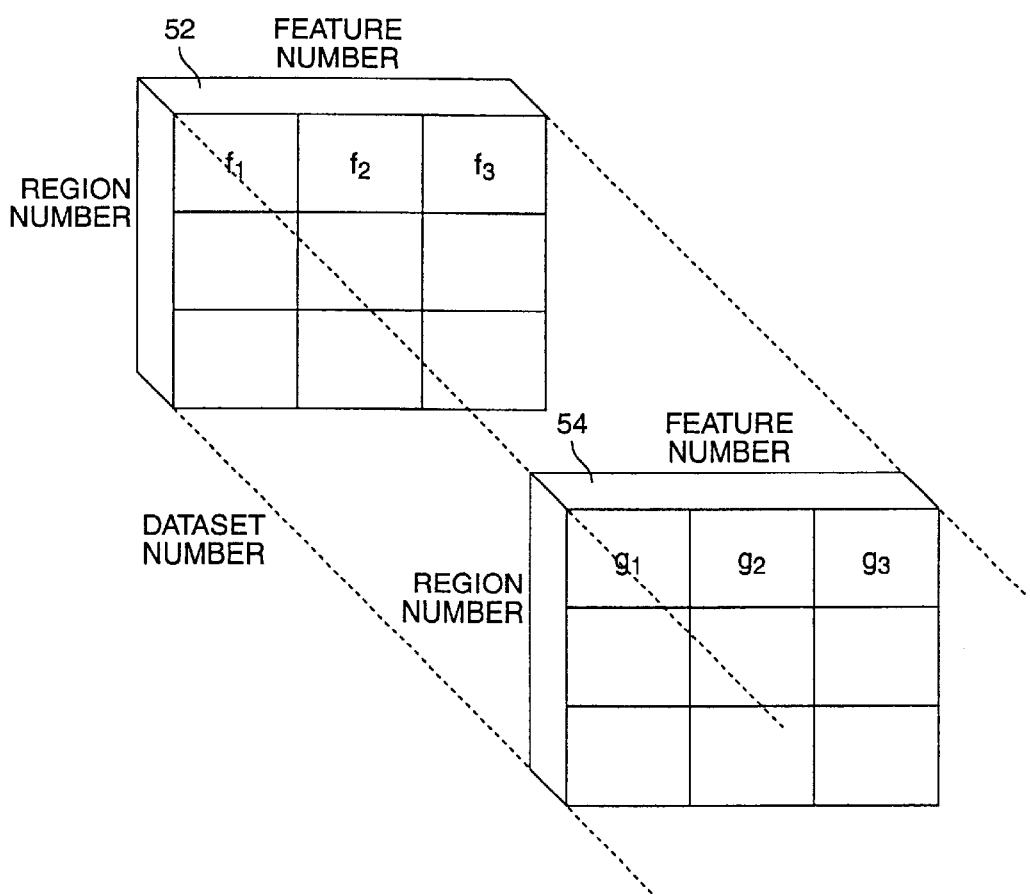
FIG. 4 is a representation of an array of feature meta-matrices containing features extracted from a plurality of raw datasets representative of a plurality of regions, which are for example one-dimensional regions.

FIG. 3 illustrates two examples 32, 34 of one-dimensional data from for example two different sensor locations yielding seismic data. The seismic data are typically collections of acoustic information which is oscillatory. Input from an operator or expert would suggest that a change in polarity of the seismic data is indicative of a change in density or impedance representing a change in material at the location of the change. Hence, the region between polarity changes can be considered homogeneous and thus so divided into partitions 40, 42, 44 and 46, 48, 50. Seismic and geological events often are characterized by multiple beds of material which are adjacent to one another along an observation axis 36 or 38. Features, such as those listed, are then calculated for each partition according to conventional methods to yield a set of features with values. Like features are calculated on each partition along each observation axis 36, 38, and the features of each partition axis 36 or 38 are assembled into an observation-point-of-view-specific matrix 52 or 54 respectively corresponding to the observation axes 36, 38, as shown in FIG. 4. While these constitute individual feature meta matrices 24 (FIG. 1) that can be processed by a classifier 26, these matrices 52, 54 can be "stacked" in order to yield a meta array, which itself can be input to and processed by classifier 26. There is no representation made that the features are independent of one another across different observation axes. Indeed, related features can be grouped to yield further clustered sets in a hierarchy of hierarchies. The groupings are thus at another scale. This type of clustering allows for scale-independent classification and change-independent scaling, which is a very powerful feature.

Figure 5:
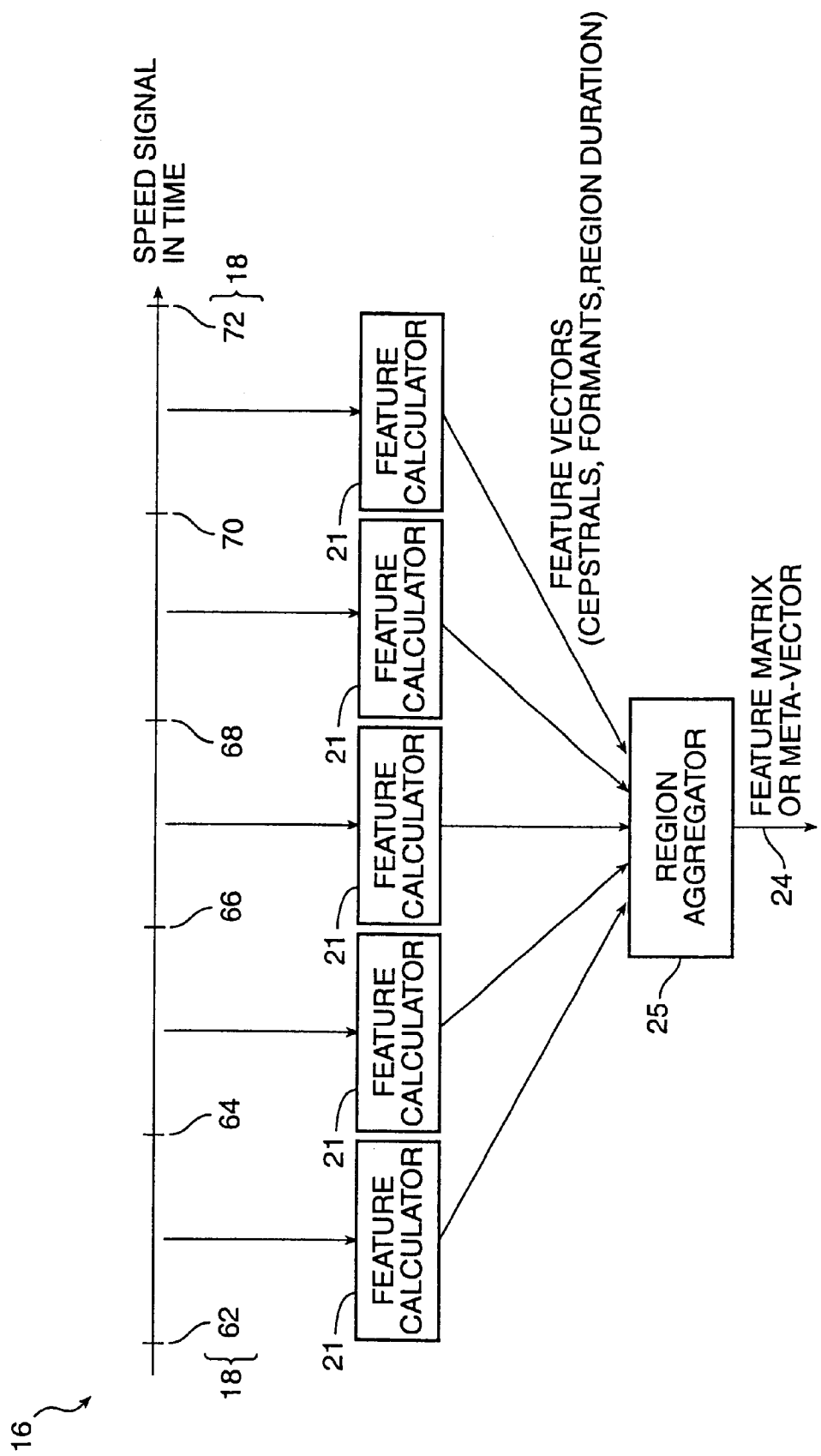
FIG. 5 is a block diagram of a speech classifier according to the invention.

FIG. 5 is an illustration of another type of one-dimensional dataset which can be readily processed according to the invention. Speech data 60 in the form of time-domain amplitude and phase information is partitioned along data-driven boundaries 62, 64, 66, 68, 70, such as silences and then features are calculated on each of the partitions, such as cepstrals, formants, partition duration, frequency distribution, wavelet decompositions, as well as peak, moment and the like. The features are assembled as feature metavectors in a feature matrix across a plurality of partitions, which are typically adjacent in time. The feature matrix is then processed by a classifier as outlined in FIG. 1.

There are a number of processes which are applied via the feature extracter according to the invention, as set forth in the following pseudo code.
Pseudo-Code

```
PARTITION DATASET INTO REGIONS
IDENTIFY SETS OF CONTIGUOUS REGIONS OF A PRESELCTED
SIZE
FOR i IN 1 TO num REGION SETS
    FOR j IN 1 TO size REGIONS SETS
        FOR k IN 1 TO num features
            COMPUTE xjk = fk(ψij)
        END FOR
    END FOR
    ẑi = r(x)
END FOR
```

The symbols are defined as follows.
x is a feature matrix structure in this pseudo code with elements $x_{ij}$.

$\psi_i$ is the $i^{th}$ region set defined upon the dataset of interest.

$\psi_{ij}$ is the $j^{th}$ element of the $i^{th}$ region set of interest.

$f_k$ is a so-called "feature function" such as first moment.

r is a classifier, such as an artificial neural network.

$\hat{z}_i$ is an estimate of the unknown state of nature (class membership), such as "malignant" or "benign" in a portion of a mammogram.

This example is generic to many applications, as for example to seismic data. If seismic data were employed, the dataset would be a one-dimensional signal, and partitioning would be based on zero crossings indicating changes in impedance.

Other examples could be constructed by substituting appropriate variables and features for the symbols.

The invention has been explained with reference to specific embodiments. Other embodiments will be evident to those of ordinary skill in the art. It is therefore not intended that the invention be limited, except as indicated by the appended claims.

What is claimed is:

1. In a computer system having as input a spatial dataset of n dimensions, where n is greater than or equal to 1, said dataset containing data being descriptive of topographically descriptive physical regions, a method for extracting features from said spatial dataset comprising:

partitioning the dataset into topographically-contiguous physical regions based on application of an indexing algorithm to said data; thereafter on each said physical region, calculating a set of features wherein the features are considered sufficiently descriptive of the physical region; thereupon grouping together in a group at least two said physical regions sharing said set of features, said at least two regions being topographically contiguous; and thereafter assembling the associated features of the group in a structure for input to a classifier.

2. The method according to claim 1 wherein said dataset is of seismic data and said partitioning step is examining change in polarity of impedance of said seismic data.

3. The method according to claim 1 wherein said features are mathematical functions.

4. The method according to claim 1 wherein said calculating is determining mean value of all data in the respective region.

5. The method according to claim 1 wherein said group structure is a vector.

6. The method according to claim 1 wherein said group structure is a matrix.

* * * * *